US009447863B2

(12) United States Patent
Tonokura et al.

(10) Patent No.: US 9,447,863 B2
(45) Date of Patent: Sep. 20, 2016

(54) LUBRICATION STRUCTURE FOR DRIVING FORCE TRANSMISSION DEVICE

(71) Applicant: HONDA MOTOR CO., LTD., Tokyo (JP)

(72) Inventors: Naomichi Tonokura, Wako (JP); Kohei Iizuka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/432,876

(22) PCT Filed: Sep. 25, 2013

(86) PCT No.: PCT/JP2013/075957
§ 371 (c)(1),
(2) Date: Apr. 1, 2015

(87) PCT Pub. No.: WO2014/054490
PCT Pub. Date: Apr. 10, 2014

(65) Prior Publication Data
US 2015/0292613 A1    Oct. 15, 2015

(30) Foreign Application Priority Data
Oct. 3, 2012  (JP) .................................. 2012-221024

(51) Int. Cl.
*F16H 57/04*   (2010.01)
*F16D 13/74*   (2006.01)
*F16D 13/52*   (2006.01)

(52) U.S. Cl.
CPC ............. *F16H 57/043* (2013.01); *F16D 13/52* (2013.01); *F16D 13/74* (2013.01);
(Continued)

(58) Field of Classification Search
None
See application file for complete search history.

(56) References Cited

U.S. PATENT DOCUMENTS 4,848,177 A * 7/1989 Miura ..................... F16H 3/663
184/31
6,059,682 A * 5/2000 Friedmann .............. F16D 13/72
192/113.35
(Continued)

FOREIGN PATENT DOCUMENTS

CN          1945052 A      4/2007
CN        101657657 A      2/2010
(Continued)

OTHER PUBLICATIONS

International Search Report dated Dec. 17, 2013 corresponding to International Patent Application No. PCT/JP2013/075957 and English translation thereof.
(Continued)

*Primary Examiner* — Dirk Wright
(74) *Attorney, Agent, or Firm* — Squire Patton Boggs (US) LLP

(57) ABSTRACT

A planetary gear has a sun gear having external teeth on an outer peripheral side, a plurality of pinion gears engaged with the sun gear, a carrier supporting the plurality of pinion gears, a circular oil catch plate on an end of the carrier, and a rotation member having a ring gear, on an outer peripheral side of the carrier and the oil catch plate. An engaging element engaged with the rotation member is disposed on an outer periphery of the planetary gear. The oil catch plate includes an open close valve which opens a passage at at least a predetermined rotation number. Lubrication oil supplied to the planetary gear is guided to the engaging element through the passage when the open/close valve is opened. This enables adjusting of the lubrication amount in accordance with a variation occurring in a ratio of a lubrication amount to each part.

5 Claims, 5 Drawing Sheets

(52) U.S. Cl.
CPC ..... *F16H 57/0473* (2013.01); *F16H 57/0479* (2013.01); *F16H 57/0482* (2013.01); *F16H 57/0484* (2013.01); *F16H 57/0427* (2013.01)

(56) References Cited

U.S. PATENT DOCUMENTS

| | | | | |
|---|---|---|---|---|
| 7,985,155 B2* | 7/2011 | Diosi | ...................... | F16C 19/30 475/160 |
| 2007/0082778 A1* | 4/2007 | Yamamura | .......... | F16D 25/0638 475/317 |

FOREIGN PATENT DOCUMENTS

| | | |
|---|---|---|
| DE | 10 2007 023953 A1 | 11/2008 |
| JP | 04-337153 A | 11/1992 |
| JP | 2000-145933 A | 5/2000 |
| JP | 2000-240771 A | 9/2000 |
| JP | 2000-337484 A | 12/2000 |
| JP | 2004-028291 A | 1/2004 |
| JP | 2006-090458 A | 4/2006 |
| JP | WO 2009008192 A1 * | 1/2009 ........... F16D 25/123 |
| JP | 4356382 B2 | 11/2009 |
| JP | 2010-174917 A | 8/2010 |

OTHER PUBLICATIONS

Notification of the First Office Action dated Jul. 4, 2016 corresponding to Chinese Patent Application No. 201380046822.7 and English translation thereof.

Search Report dated Jul. 4, 2016 corresponding to Chinese Patent Application No. 201380046822.7 and English translation thereof.

* cited by examiner

LUBRICATION STRUCTURE FOR DRIVING FORCE TRANSMISSION DEVICE

TECHNICAL FIELD

The present invention relates to, in a driving force transmission device for transmitting a driving force from a driving source, a lubrication structure for lubricating a planetary gear (a planetary gear mechanism), an engaging element, and the like which configure the driving force transmission device.

BACKGROUND OF THE INVENTION

Some automatic transmissions (driving force transmission devices) provided in a vehicle have a gear shift mechanism including a planetary gear (a planetary gear mechanism) as a gear shift mechanism for shifting a driving force from an input shaft (a rotation shaft) and outputting the same. The planetary gear has a sun gear installed on the input shaft, a carrier supporting a plurality of pinion gears and pinion shafts on an outer diameter side of the sun gear, and a ring gear engaged with the pinion gear on an outer diameter side of the carrier. Some planetary gears described above are, for example, as shown in Patent Literature 1 and 2, equipped with an oil catch plate (a lubrication oil guiding member) for guiding lubrication oil to an end of the carrier (an end of an axial direction). In the planetary gears, lubrication oil is supplied to a rotary sliding portion of such as the bear ring mounted between the pinion shaft and the pinion gear, by the oil catch plate.

In addition, in some automatic transmissions, an engaging element (a friction engaging element) such as a clutch and a brake are disposed so as to be overlap with each other in a radial direction on an outer diameter side of a planetary gear installed on an input shaft. In the configuration, some of lubrication oil supplied from a side of the input shaft is caught by the above-described oil catch plate and is supplied to an inner part of the planetary gear. Remaining lubrication oil is supplied to the engaging element such as the clutch and the brake, through an outer side of the oil catch plate. And in Patent Literature 3, in the lubrication structure, disclosed is an oil catch plate configured so that a ratio of lubrication oil supplied to a planetary gear and a ratio of lubrication oil supplied to an engaging element are optimal.

RELATED ART REFERENCES

Patent Literature

Patent Literature 1: Japanese Unexamined Patent Application Publication No. 2000-145933
Patent Literature 2: Japanese Unexamined Patent Application Publication
No. 2006-090458
Patent Literature 3: Japanese Patent No. 4356382

DISCLOSURE OF THE INVENTION

Problems to be Solved by the Invention

Nevertheless, a variation (a difference) occurs in a ratio of a lubrication amount (an amount of lubrication oil) required by the planetary gear and a ratio of lubrication amount required by the engaging element, accompanying with changes of a rotation number (a rotation speed) of the planetary gear and the engaging element such as the clutch and the brake. For example, the ratio of the lubrication amount required by the engaging element increases as the rotation number of the rotation shaft increases, whereas the lubrication amount required by the planetary gear does not greatly increase even when the rotation number increases. In that case, when supplying lubrication oil at a fixed ratio to the planetary gear and the engaging element regardless of the rotation number of the rotation shaft, a surplus of the lubrication amount occurs in some parts (for example, the planetary gear), and a shortage of the lubrication amount occurs in other parts (for example, the engaging element). As a result, there is a concern that a friction by lubrication oil increases in the part having a surplus of the lubrication amount, and there are increased risks of deterioration and seizure due to an excessive temperature rising of components in the part where the lubrication amount is insufficient.

The present invention is achieved in view of the above-described problems, and the purpose of the invention is to provide a lubrication structure for a driving force transmission device capable of properly adjusting a lubrication amount to each part in accordance with a variation in a ratio of a required lubrication amount of each part, even when the variation occurs due to changes of a rotation number.

Means of Solving the Problem

The present invention to solve the above-described problems is as follows.

A lubrication structure for a driving force transmission device according to the present invention has a planetary gear (1) including a plurality of rotation elements (10, 30, 40) disposed in a predetermined relation around a rotation shaft (2), an engaging element (80) disposed on an outer peripheral side of the planetary gear (1), and a lubrication oil guiding member (60) for guiding lubrication oil installed on the planetary gear (1). The lubrication oil guiding member (60) has a first oil passage (64, 62) for guiding lubrication oil supplied from a side of the rotation shaft (2) to an inner part of the planetary gear (1), a second oil passage for guiding lubrication oil supplied from a side of the rotation shaft (2) to the engaging element (80), a third oil passage (65) for guiding some of lubrication oil which circulates through the first oil passage (64, 62) to the engaging element (80), and an open/close means (70) for opening and closing the third oil passage (65). The open/close means (70) opens the third oil passage (65) when a rotation number of the lubrication oil guiding member (60) reaches equal to or more than a predetermined rotation number.

According to the configuration, even when a variation (a difference) occurs in a ratio of a lubrication amount of the planetary gear and the engaging element due to changes of a rotation number of the rotation shaft, a distribution of the lubrication amount to the planetary gear and the engaging element can be adjusted in accordance with the variation. This enables to prevent a friction due to lubrication oil in a part having a surplus of lubrication amount (the planetary gear) from increasing, as well as to prevent problems such as deterioration and seizure due to an excessive temperature rising of components in a part where the lubrication amount is insufficient (the engaging element).

In addition, in the above-described lubrication structure for a driving force transmission device, a valve body (72) is seated on a valve seat portion (71) by an energizing force of an energizing means (73), thereby the open/close means (70) closes the third oil passage (65). And the valve body (72) may be separated from the valve seat portion (71) against the energizing force of the energizing means (73) by a centrifugal force applied to the valve body (72) generated by a rotation of the lubrication oil guiding member (60). This enables to, by a simple configuration, automatically open an open/close valve in accordance with a rotation number of the rotation shaft, and properly adjust a distribution of lubrication amount between the planetary gear and the engaging element.

Furthermore, in the above-described lubrication structure for a driving force transmission device, the lubrication oil guiding member (60) may be formed in a circular and annular flat plate shape. The first oil passage (64, 62) may include a groove portion (64) recessed toward an outer diameter side, which is formed on an inner diameter side of the lubrication oil guiding member (60). The third oil passage (65) may be a communication passage communicating to an outer peripheral edge (61*c*) of the lubrication oil guiding member (60) from the groove portion (64). This enables to, by a simple configuration, properly adjust a distribution of lubrication amount between the engaging element and the planetary gear.

In addition, the first oil passage (64, 62) may include a cylindrical passage (62) which extends to a side of the planetary gear (1) by penetrating the lubrication oil guiding member (60) from the groove portion (64). The planetary gear (1) may have a sun gear (10) installed on the rotation shaft (2), a carrier (20) supporting a plurality of pinion gears (30) and pinion shafts (40) on an outer diameter side of the sun gear (10), and a ring gear (51) engaged with the pinion gear (30) on an outer diameter side of the carrier (20). The cylindrical passage (62) may guide lubrication oil supplied from a side of the rotation shaft (2) to the rotary sliding portion (32) of the pinion gear (30) through the pinion shaft (40). The configuration enables to optimize a lubrication amount of the rotary sliding portion between the pinion gear and the pinion shaft where lubrication is required in the planetary gear.

Effects of the Invention

According to a lubrication structure for a driving force transmission device in accordance with the present invention, even when a variation (a difference) occurs in a ratio of a lubrication amount required for a planetary gear and an engaging element due to changes of a rotation number of a rotation shaft, a ratio of the lubrication amount to the planetary gear and the engaging element can be adjusted in accordance with the variation.

BRIEF DESCRIPTION OF THE DRAWINGS

FIG. 3A shows a state where the open/close valve is closed, and FIG. 3B shows a state where the open/close valve is opened.

MODE FOR CARRYING OUT THE INVENTION

Embodiments of the present invention are described hereinafter referring to the attached drawings.

Figure 1:
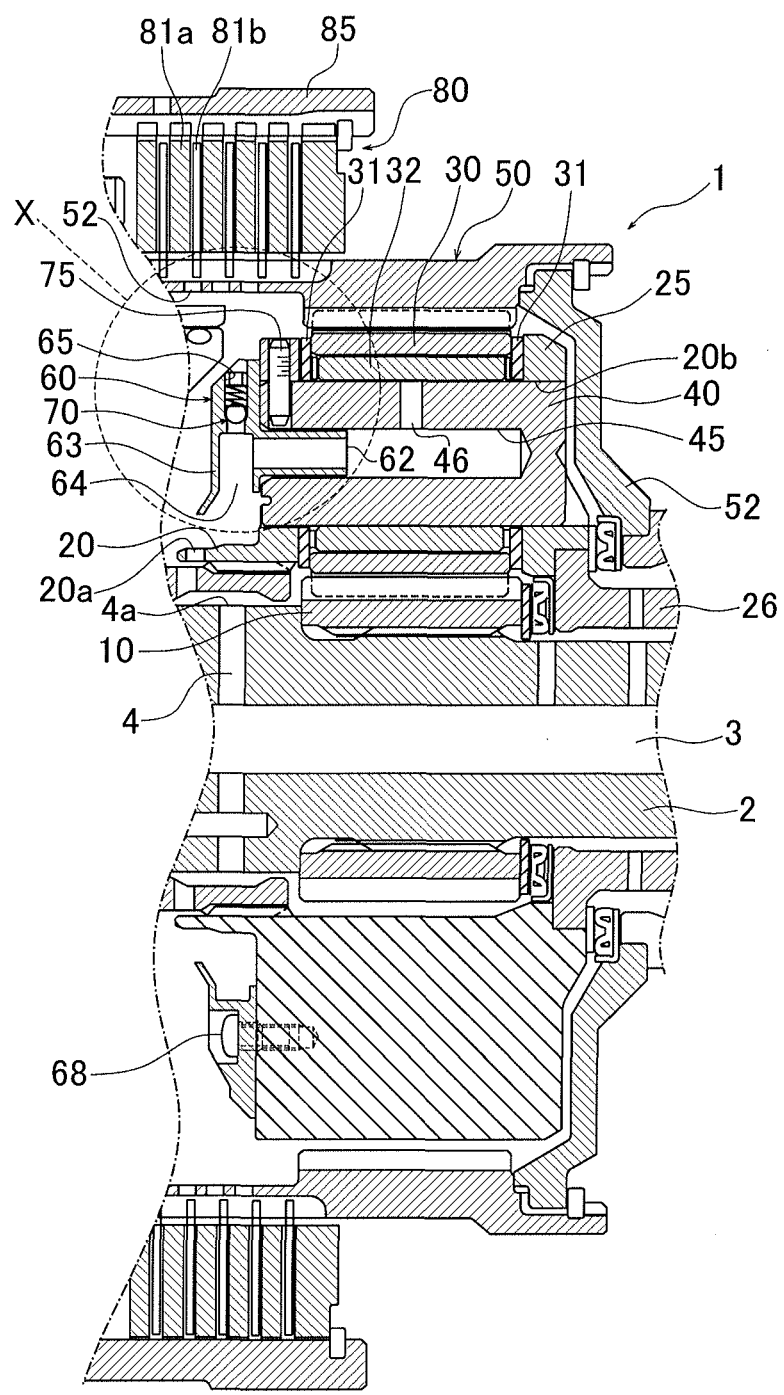
FIG. 1 is a sectional side view for showing a configuration example of a driving force transmission device in accordance with an embodiment of the present invention.
Figure 2:
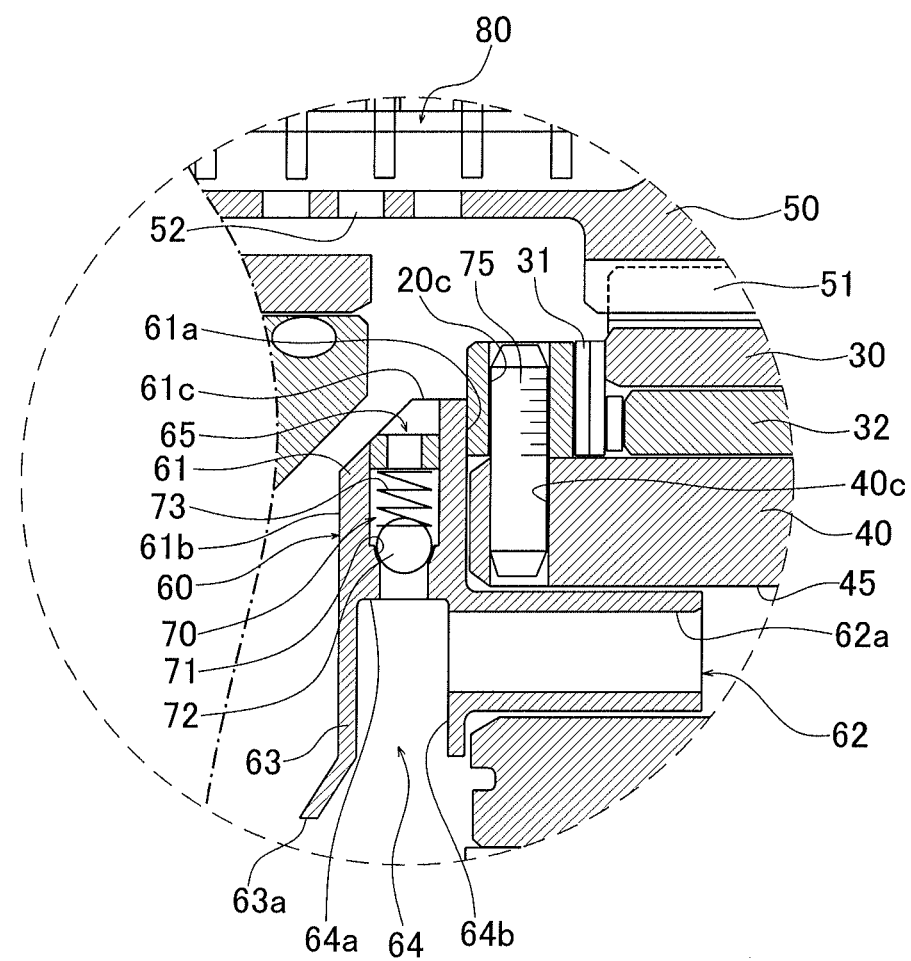
FIG. 2 is an expanded sectional view of an oil catch plate and a peripheral part thereof in the driving force transmission device.

FIG. 1 is a sectional side view for showing a configuration example of a driving force transmission device in accordance with an embodiment of the present invention. In addition, FIG. 2 is an expanded sectional view of an oil catch plate and a peripheral part thereof in the driving force transmission device. A planetary gear 1 shown in FIG. 1 configures a gear mechanism for gear shift with which an automatic transmission is provided. The planetary gear 1 is installed on an input shaft 2, and includes a sun gear 10 having external teeth formed on an outer periphery, a plurality of (for example, 5 pieces) pinion gears 30 engaged with the outer teeth of the sun gear 10, a carrier 20 for supporting the plurality of pinion gears 30, and a rotation member 50 installed on an outer peripheral side of the carrier 20. A ring gear 51 engaged with the pinion gear 30 is formed on an inner periphery of the rotation member 50. Furthermore, when descriptions below refer to an axial direction, an axial direction of the input shaft 2 is indicated.

A circular and annular shaped oil catch plate (a lubrication oil guiding member) 60 is attached onto an end of an axial direction of the carrier 20. In addition, a clutch or a brake (described as "engaging element" hereinafter) 80 mounted between a casing 85 which is a fixed side member and the rotation member 50 is disposed on an outer diameter side of the planetary gear 1. The engaging element 80 is a friction engaging type engaging element having a plurality of friction members 81*a* attached onto a side of the casing 85 and another plurality of friction members 81*b* attached onto a side of the rotation member 50 alternately laminated along the axial direction. By pushing the laminated friction members 81*a* and 81*b* in the axial direction, the rotation member 50 is locked to the casing 85. In addition, the engaging element 80 is a wet friction engaging element supplied with lubrication oil from a side of the input shaft 2.

The input shaft (the rotation shaft) 2 rotates by a driving force from a driving source such as an engine. A hollow shaft oil passage 3 extending in an axial direction inside the input shaft 2 and a radial oil passage 4 penetrating outward in a radial direction from the shaft oil passage 3 are formed on the input shaft 2. Lubrication oil introduced into the shaft oil passage 3 of the input shaft 2 flows through the radial oil passage 4 from the shaft oil passage 3 to be discharged from an opening portion 4*a* of the radial oil passage 4 opening to an outer peripheral side surface of the input shaft 2.

The sun gear 10 of the planetary gear 1 is spline-fitted to an outer periphery of the input shaft 2. The carrier 20 is provided with a body portion 25 having a circular and annular shape which is rotatably disposed around the input shaft 2 and a flange portion 26 having a small-diameter cylindrical shape which is integrally formed on an inner periphery side of the body portion 25. The input shaft 2 is arranged on an inner diameter side of the flange portion 26. In addition, a guide hole 20*a* is formed at a position corresponding to the radial oil passage 4 of the input shaft 2 in the carrier 20. The guide hole 20*a* guides lubrication oil discharged from the radial oil passage 4 to a side of the oil catch plate 60.

A pinion shaft 40 is installed in a shaft hole 20*b* provided to the carrier 20. The pinion shaft 40 is supported in parallel to the input shaft 2 on an outer peripheral side of the input shaft 2. A pinion gear 30 is axially supported to the pinion shaft 40 via a bearing 32. A washer (a thrust washer) 31 which receives an axial load is attached on both axial ends of the pinion gear 30 axially supported to the pinion shaft 40. The plurality of sets (for example, 5 sets) of the pinion shaft 40 and of the pinion gear 30 are installed at equal intervals along a peripheral direction in the carrier 20. A hollow portion 45 having an oblong hole extending to an axial direction is formed in the pinion shaft 40. The hollow portion 45 is opened to an axial end of the pinion shaft 40 (an end on a side of the oil catch plate 60).

As shown in FIG. 2, the oil catch plate 60 is integrally provided with an annular flat plate shaped body portion 61 having a penetrating hole at a center thereof and a cylindrical portion 62 having a cylindrical-shaped small projection, which is disposed on a side surface 61a on a side of the carrier 20 of the body portion 61. The cylindrical portion 62 is vertically projected from the side surface 61a of the body portion 61, and a plurality of (for example, 5 pieces) the cylindrical portion 62 are formed at equal intervals along a peripheral direction of the body portion 61. A hollow portion 62a having a hollow penetrating hole is formed in the cylindrical portion 62. In addition, a collar portion 63 having a substantially flat plate shape, which is extending inward in a radial direction is projectingly formed on an inner side of the body portion 61. A lubrication groove 64 are formed on a side of the side surface 61a of the collar portion 63. The lubrication groove 64 takes lubrication oil discharged from the guide hole 20a of the carrier 20. The lubrication groove 64 includes a bottomed recessed portion having a bottom surface 64a on a radial outside on an inner periphery of the body portion 61. The hollow portion 62a of the cylindrical portion 62 is communicated to an inner side surface 64b of the lubrication groove 64 (a side surface on a side of the planetary gear 1). As shown in FIG. 1, the lubrication groove 64 is arranged at an opposite position to the guide hole 20a of the carrier 20. Also, a tip 63a of the collar portion 63 (a tip of an inner diameter side) is axially inclined in a direction away from the planetary gear 1. Accordingly, an aperture on an inner diameter side of the lubrication groove 64 opposite to the guide hole 20a of the carrier 20 is enlarged larger than an aperture on an outer diameter side (a side of the bottom surface 64a).

A passage (a third oil passage) 65 having a penetrating hole extending to a radial direction is formed between the lubrication groove 64 and an outer peripheral edge 61c of the body portion 61 in the oil catch plate 60. An open/close valve 70 is installed on the passage 65. As shown in FIG. 2, the open/close valve 70 is provided with a stepped valve seat portion 71 formed on an outer peripheral surface of the passage 65, a spherical valve body 72 seated on the valve seat portion 71, and a coil spring (an energizing means) 73 for energizing the valve body 72 toward the valve seat 71. The coil spring 73 is disposed so that the valve body 72 is seated on the valve seat 71 by energizing the valve body 72 inward in a radial direction.

Figure 3A:
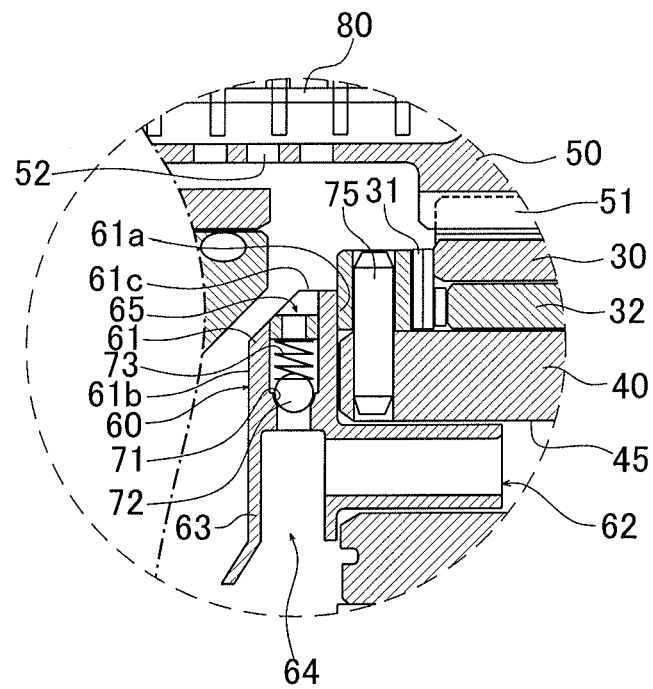
FIGS. 3A and 3B show an operation of an open/close valve.
Figure 3B:
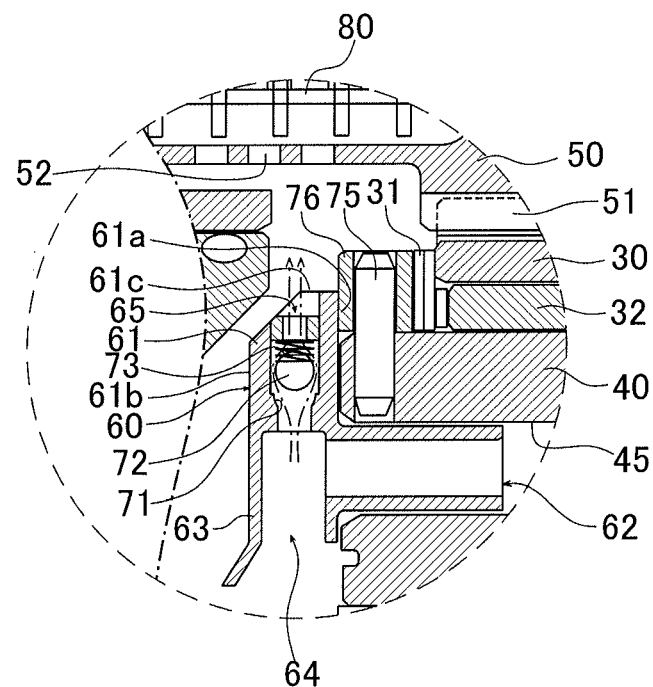

FIGS. 3A and 3B illustrate an operation of the open/close valve 70. FIG. 3A shows a state where the open/close valve is closed, and FIG. 3B shows a state where the open/close valve 70 is opened. The valve body 72 of the open/close valve 70 is, as shown in FIG. 3A, seated on the valve seat 71 by being pushed inward in a radial direction by an energizing force of the coil spring 73 until a rotation number of the oil catch plate 60 exceeds a predetermined rotation number set in advance (a rotation number R1 shown in FIG. 5). Accordingly, the passage 65 is closed by the valve body 72. Also, when the rotation number of the oil catch plate 60 exceeds the above-described predetermined rotation number, as shown in FIG. 3B, the valve body 72 is moved outward in a radial direction (an upper direction in FIG. 2) by a centrifugal force applied to the valve body 72 accompanying with the rotation number of the oil catch plate 60. Consequently, the valve body 72 is separated from the valve seat portion 71 to open the passage 65. Accordingly, the lubrication groove 64 and the outer peripheral edge 61c of the body portion 61 are communicated in the oil catch plate 60. Thus, the open/close valve 70 is configured so as to open the passage 65 by a centrifugal force accompanying with a rotation of the oil catch plate 60.

As shown in FIG. 1, the oil catch plate 60 having the above-described configuration is attached on an end of the carrier 20 by fastening a screw 68. Under the condition, an end of the pinion shaft 40 is covered by the oil catch plate 60. In addition, the cylindrical portion 62 of the oil catch plate 60 is inserted into the hollow portion 45 of the pinion shaft 40. The oil catch plate 60 rotates integrally with the carrier 20 accompanying with a rotation of the carrier 20. Furthermore, as shown in FIG. 2, a pin 75 for preventing the pinion shaft 40 from turning and coming off is inserted into an end of the pinion shaft 40. The pin 75 is inserted in a radial direction along an insertion hole 20c provided on the carrier 20 and an insertion hole 40c provided on the pinion shaft 40 to be fixed by an engagement (a screw) of a screw groove and a screw thread provided between the pin 75 and the insertion hole 20c.

Figure 4:
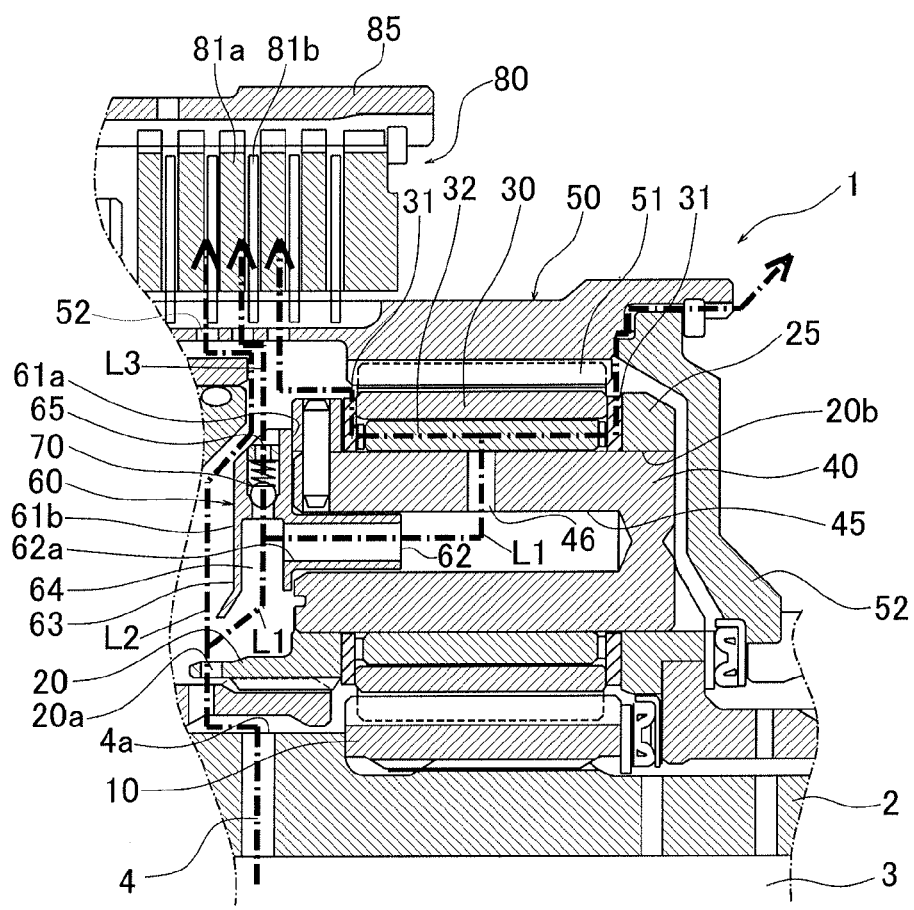
FIG. 4 shows a path through which lubrication oil flows in the driving force transmission device.

FIG. 4 shows a path through which lubrication oil flows in the planetary gear 1 and a periphery of the same. A flow of lubrication oil is shown by a dashed line in the figure. The open/close valve 70 is closed to close the passage 65 when a rotation number of the oil catch plate 60 is less than the above-described predetermined rotation number. In this state, lubrication oil supplied to the shaft oil passage 3 of the input shaft 2 is guided to the radial oil passage 4 by a centrifugal force accompanying with a rotation of the input shaft 2. The lubrication oil discharged from the radial oil passage 4 is guided to the guide hole 20a of the carrier 20 to be discharged (scattered) from the guide hole 20a. Also, some of the lubrication oil discharged from the guide hole 20a is, as an oil passage (the first oil passage) L1 shown in FIG. 4, guided to the lubrication groove 64 of the oil catch plate 60.

The lubrication oil guided to the lubrication groove 64 flows through a hollow portion 62a of the cylindrical portion 62, flows through the hollow portion 45 and the penetrating hole 46 of the pinion shaft 40, and is discharged from the penetrating hole 46. The lubrication oil discharged from the penetrating hole 46 is supplied to the bearing 32 interposed between the pinion shaft 40 and the pinion gear 30. This lubricates the bearing 32. Moreover, some of the lubrication oil supplied to the bearing 32 is guided to an outer peripheral side of the pinion gear 30 by a centrifugal force accompanying with a rotation of the pinion gear 30, thereafter, is guided to the engaging element 80 through the ring gear 51 (the rotation member 50).

Whereas, the remaining lubrication oil discharged from the guide hole 20a is, as the oil passage (a second oil passage) L2 shown in FIG. 4, supplied outward in a radial direction along a side surface 61b on the opposite side from the carrier 20 in the oil catch plate 60. The lubrication oil is guided to the engaging element 80 through an opening portion 52 of the rotation member 50. This lubricates the engaging element 80.

In addition, the open/close valve 70 is opened when a rotation number of the oil catch plate 60 (a rotation number of the carrier 20) exceeds the above-described predetermined rotation number. The passage 65 is opened when the open/close valve 70 is opened. The passage 65 communicates the lubrication groove 64 with the outer peripheral edge 61c in the oil catch plate 60. Accordingly, in a state where the open/close valve 70 is opened, some of the lubrication oil guided to the lubrication groove 64 flows through the passage 65 and is guided to the engaging element 80 as an oil passage (a third oil passage) L3 shown in FIG. 4, without flowing toward the hollow portion 62a of the cylindrical portion 62.

Figure 5:
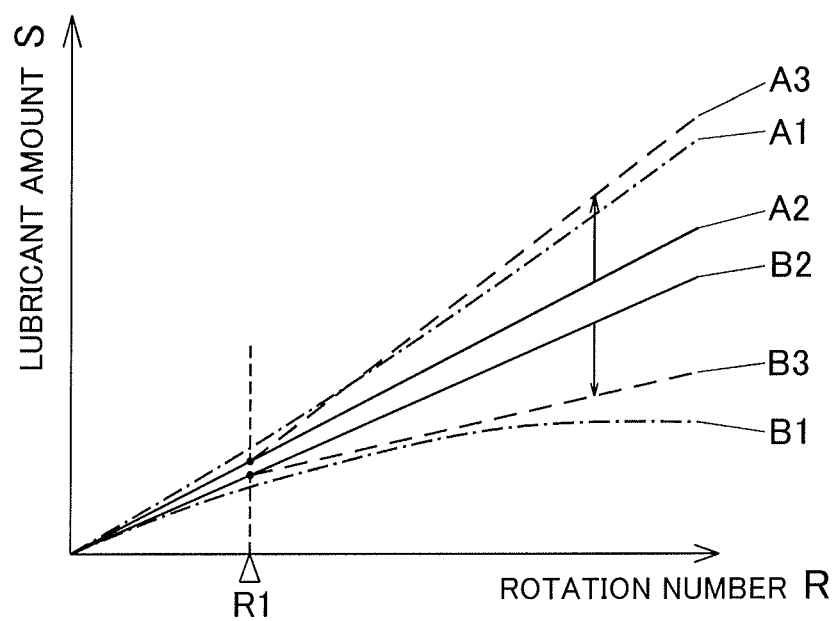
FIG. 5 shows a relation between a rotation number of the oil catch plate and a flow amount of lubrication oil required for a planetary gear and an engaging element.

FIG. 5 is a graph showing a relation between a rotation number of the oil catch plate 60 (the carrier 20) and a flow amount (a lubrication amount) of lubrication oil required for the planetary gear 1 and the engaging element 80. A rotation number R of the oil catch plate 60 is indicated in a lateral axis and a flow amount (a lubrication amount) S of lubrication oil is indicated in a vertical axis. In addition, A1 in the graph shows a target lubrication amount of the engaging element 80 (an optimum lubrication amount which is neither excessive nor insufficient). A2 shows an actual lubrication amount of the engaging element 80 in a case where the oil catch plate 60 is not provided with the open/close valve 70. A3 shows an actual lubrication amount of the engaging element 80 in an open state of the open/close valve 70 in a case where the oil catch plate 60 is provided with the open/close valve 70. B1 shows a target lubrication amount of the planetary gear 1 (the bearing 32 between the pinion gear 30 and the pinion shaft 40). The target lubrication amount is, in other words, an optimum lubrication amount which is neither excessive nor insufficient in the planetary gear 1. B2 shows an actual lubrication amount of the planetary gear 1 in a case where the oil catch plate 60 is not provided with the open/close valve 70. B3 shows an actual lubrication amount of the planetary gear 1 in an open state of the open/close valve 70 in a case where the oil catch plate 60 is provided with the open/close valve 70.

As shown in FIG. 5, the target lubrication amount A1 required by the engaging element 80 increases as the rotation number R of the oil catch plate 60 increases, whereas the target lubrication amount B1 required by the planetary gear 1 does not increase so greatly as the target lubrication amount A1 required by the engaging element 80. In addition, a centrifugal force is increased as a rotation number of the oil catch plate 60 is increased, thereby a lubrication amount discharged (scattered) from the guide hole 20a of the carrier 20 is increased. Hereupon, when the oil catch plate 60 is not provided with the open/close valve 70, a lubrication amount to the planetary gear 1 and a lubrication amount to the engaging element 80 are increased at a fixed ratio. Accordingly, as a rotation number of the oil catch plate 60 is increased, the lubrication amount A2 in the engaging element 80 becomes insufficient more substantially than the target lubrication amount A1. On the other hand, the lubrication amount B2 in the planetary gear 1 is excessive more substantially than the target lubrication amount B1.

On the other hand, in a case where the oil catch plate 60 is provided with the open/close valve 70, the open/close valve 70 is opened when the rotation number R of the oil catch plate 60 reaches a predetermined rotation number R1. Consequently, some of the lubrication oil taken into the lubrication groove 64 of the oil catch plate 60 through the oil passage L1 is guided to the engaging element 80 through the open/close valve 70 (the oil passage L3). Also, a lubrication amount through the open/close valve 70 is increased as a rotation number of the carrier 20 is increased. Accordingly, the lubrication amount A3 in the engaging element 80 approaches the target lubrication amount A1, and the lubrication amount B3 in the planetary gear 1 approaches the target lubrication amount B1.

As described above, according to the embodiments, the open/close valve 70 which opens the valve at equal to or more than a predetermined rotation number is provided in a middle of the oil passage (the oil passage L1) for guiding lubrication oil supplied from a side of the input shaft 2 to a side of the pinion gear 30 (an outer peripheral side of the lubrication groove 64 of the oil catch plate 60). Thereby, even when a variation (a difference) in a ratio of lubrication amount of each part (the planetary gear 1, the engaging element 80) is occurred by a variation in a rotation number, a distribution of the lubrication amount to the each part can be adjusted in accordance with the variation. As a result, a friction on a part where a lubrication amount is excessive (the planetary gear 1) is prevented from increasing, and a part where the lubrication amount is insufficient (the engaging element 80) can be prevented from having problems such as deterioration and seizure of components.

In addition, according to the above-identified embodiments, the open/close valve 70 is provided to the oil catch plate 60 which rotates accompanying with a rotation of the input shaft 2, and configured so as to be opened by an centrifugal force accompanying with the rotation of the input shaft 2. This enables to automatically open the open/close valve 70 in accordance with a rotation number of the input shaft 2 and to properly adjust a distribution of a lubrication amount of the planetary gear 1 and the engaging element 80.

Though the embodiments of the present invention were described above, the present invention is not limited to the above-described embodiments, and various deformations can be achieved within a scope of the technical ideas described in Claims, Specification, and Drawings. For example, though described is a case where the carrier 20 and the oil catch plate 60 are composed separately, the lubrication oil guiding member (the oil catch plate) in accordance with the present invention can be composed integrally with the carrier. Furthermore, the oil catch plate 60 shown in the above-described embodiment is an example of the lubrication oil guiding member in accordance with the present invention. Thereby, such as a specific shape of the lubrication oil guiding member in accordance with the present invention is not be limited to such as the shape with which the above-described oil catch plate 60 is provided.

The invention claimed is:

1. A lubrication structure for a driving force transmission device, comprising:
   a planetary gear having a plurality of rotation elements disposed in a predetermined relation around a rotation shaft;
   an engaging element disposed on an outer peripheral side of the planetary gear; and
   a lubrication oil guiding member for guiding lubrication oil attached on the planetary gear,
   wherein the lubrication oil guiding member comprises:
      a first oil passage for guiding lubrication oil supplied from a side of the rotation shaft to an inner part of the planetary gear;
      a second oil passage for guiding lubrication oil supplied from a side of the rotation shaft to the engaging element;
      a third oil passage for guiding some of lubrication oil which circulates through the first oil passage to the engaging element; and
      an open/close means for opening and closing the third oil passage,
   wherein the open/close means opens the third oil passage when a rotation number of the lubrication oil guiding member is equal to or more than a predetermined rotation number.

2. The lubrication structure for a driving force transmission device according to claim 1, wherein the open/close means is an open/close valve closing the third oil passage since a valve body is seated on a valve seat portion by an energizing force of an energizing means, and is configured so that the valve body is separated from the valve seat portion against an energizing force of the energizing means by a centrifugal force applied to the valve body due to a rotation of the lubrication oil guiding member.

3. The lubrication structure for a driving force transmission device according to claim 1, wherein the lubrication oil guiding member is formed in a circular and annular flat plate shape, the first oil passage has a groove portion recessed toward an outer diameter side, which is formed on an inner diameter side of the lubrication oil guiding member, and the third oil passage is a communication passage for communicating the groove portion to an outer peripheral edge of the lubrication oil guiding member.

4. The lubrication structure for a driving force transmission device according to claim 3, wherein the first oil passage includes a cylindrical passage extending to a side of the planetary gear by penetrating the lubrication oil guiding member from the groove portion, wherein the planetary gear comprises a sun gear installed on the rotation shaft, a carrier which supports a plurality of pinion gears and pinion shafts on an outer diameter side of the sun gear, and a ring gear engaged with the pinion gear on an outer diameter side of the carrier, wherein the cylindrical passage guides lubrication oil supplied from a side of the rotation shaft to a rotary sliding portion of the pinion gear through the pinion shaft.

5. The lubrication structure for a driving force transmission device according to claim 2, wherein the lubrication oil guiding member is formed in a circular and annular flat plate shape, the first oil passage has a groove portion recessed toward an outer diameter side, which is formed on an inner diameter side of the lubrication oil guiding member, and the third oil passage is a communication passage for communicating the groove portion to an outer peripheral edge of the lubrication oil guiding member.

* * * * *